United States Patent

[11] 3,615,683

| [72] | Inventor | Peter Xenophon Hoynak |
| | | Fort Lee, N.J. |
| [21] | Appl. No. | 726,238 |
| [22] | Filed | May 2, 1968 |
| [45] | Patented | Oct. 26, 1971 |
| [73] | Assignee | CPC International Inc. |

[54] USE OF MICROWAVES FOR BAKING
1 Claim, No Drawings

[52] U.S. Cl. .................................................. 99/92
[51] Int. Cl. ............................................. A21d 13/08
[50] Field of Search ................................. 99/92, 217, 221, 86

[56] References Cited
UNITED STATES PATENTS
2,845,356 7/1958 Battiste .................. 99/92
3,479,188 11/1969 Thelen .................... 99/92 X

OTHER REFERENCES

Nordin et al. " Browning Reaction Products of Cake Crumb" Cereal Chemistry Vol. 34, No. 3 May 1957 P. 170, 171

Copson " Microwave Heating" Avi Publishing Co., Inc. 1962 Westport Conn. Pages 378– 382

Food Engineering, August 1964, page 95, article entitled " Microwaves Improve Color Control"

*Primary Examiner*—Raymond N. Jones
*Attorneys*—Frank E. Robbins, James L. Bailey, Janet E. Price, Robert D. Weist and Martha A. Michaels ABSTRACT: The present invention relates to the baking of cakes by the use of microwaves. More particularly, the present invention relates to the use of dextrose in a cake formulation which is subsequently baked in a microwave oven. It has been discovered that dextrose may be freely used in cake formulations without development of color when the cake formulation is baked in a microwave oven.

USE OF MICROWAVES FOR BAKING

The present invention relates to the use of dextrose in cake formulations which are subsequently baked in a microwave oven. More particularly, the present invention relates to the use of microwaves to bake a cake formulation which contains a substantial amount of dextrose in place of sucrose.

It has been known that the use of dextrose in cake formulations may improve the texture and moisture content of the cake. However, during the slow cooking, particularly of pound cakes, at a relatively low temperature the dextrose and protein interact resulting in a brownish color. Although the discoloration does not affect the taste or texture of the cake, it is most unappealing to the eye.

It is therefore an object of the present invention to provide a method for making a cake containing a reducing sugar such as dextrose, wherein the cake retains its normal color.

It is another object of the present invention to provide a method for baking a cake containing dextrose.

It is still another object of the invention to provide a formulation for a cake containing dextrose but otherwise having satisfactory moisture, color, texture, and flavor.

Other objects of the invention will be apparent from the following description and from the appended claims.

The present invention provides a process for preparing a dextrose-containing cake which comprises preparing a cake batter wherein at least about 10 percent of the sugar constituent is a reducing sugar, such as dextrose, and cooking the cake batter by a microwave technique to yield a cake which does not develop color.

The sugar constituent is comprised of at least about 10 percent of a reducing sugar such as dextrose, levulose, invert sugar or a combination thereof. If less than 100 percent of the sugar constituent is a reducing sugar, the remainder is preferably sucrose or cane sugar. For example, a particularly suitable sugar constituent ranges from about 10 percent to about 90 percent dextrose and from about 90 percent to about 10 percent sucrose. Any combination of reducing sugars may be used whether or not in the presence of sucrose. Illustrations of some of the combinations appear in the example below.

Generally in commercial production of cakes in large baking operations, it is preferable to add the sugar constituent as a liquid for ease of mixing. Thus, in the present invention it is preferable to add the sugar constituent as an aqueous solution. Generally, the solution will have a solids content in the range of about 50 percent to about 75 percent, preferably about 70 percent. Ranges higher than 75 percent may be used but it frequently will be necessary to heat the sugar solution so as to dissolve all of the sugar crystals.

The cake batter is mixed in conventional manners and then subjected to cooking in a microwave oven.

In microwave cooking, the material to be cooked is simply saturated with a controlled amount of microwave energy. The strong alternating electric field reverses the "molecular polarization" of the substance many million times a second and the resulting friction generates heat or causes other nonthermal effects. The heat generating internal friction, resulting in cooking of the cake batter, does not permit the browning reaction between protein and dextrose to take place. Thus, the cakes so produced are not discolored; however, if color in the crust is desired, radiant lamps in the microwave oven will allow formation of a brown crust. Alternatively, a crust may be formed by short term treatment in a conventional oven subsequent to the microwave cooking.

Several bands of frequencies are available for microwave processing. These frequencies are in the range of 900 megacycles, 2,400 megacycles, 5,700 megacycles, and 22,000 megacycles. In the instant case, it has been found preferable to use a microwave frequency of 2,450 megacycles ±50.

In the following examples all percentages are by weight, temperatures in degrees Fahrenheit, and microwave frequencies in megacycles unless otherwise specified.

EXAMPLE

In all of the following formulations for pound cakes only the sugar constituent was varied. The other ingredients remained constant. The basic ingredients were as follows:

| | |
|---|---|
| Flour | 420.0 grams |
| Shortening | 240.0 grams |
| Milk | 21.6 |
| Baking powder | 2.0 grams |
| Salt | 15.0 grams |
| | Total 698.6 grams |

These ingredients were blended in an automatic mixer on low speed for 3 minutes.

2½ following constituents were blended at medium speed for 2 minutes.

| | |
|---|---|
| Vanilla | 4.0 grams |
| Sugar Solution | 637.9 grams |
| Eggs | 264.0 grams |
| | Total 905.9 grams |
| | Combined total 1,604.5 grams |

In each case, the batter was poured into glass baking dishes to a level of approximately 1½ inches in depth. Each batch of batter was divided into two dishes.

In the first instance, a sucrose solution having a Brix value of 67° was used as the sugar constituent. The batter was divided into two dishes. One was baked at a conventional temperature of about 325° F. for a little over an hour in a standard oven. The other was baked in a microwave oven for eight minutes at 2,450 megacycles. In each instance, the interior of the cake reached a temperature in excess of 200° F., e.g. approximately 210° F. The first cake cooked in the standard oven was of acceptable color, flavor, appearance, and texture, and had a moisture content of approximately 24 percent.

The cake cooked in the microwave oven was of satisfactory flavor, texture and general appearance but was somewhat discolored or dark. The moisture content was about 16 percent.

The same formulation was again used except that the sugar constituent consisted of 70 percent sucrose and 30 percent dextrose in solution at 67° Brix. Again the batter mix was divided into two quantities, each being poured into a baking dish to provide a depth of about 1½ inches. The cakes were processed in the same manner as those containing the sucrose sugar.

The cake cooked under conventional conditions was quite dark and the flavor was not as good as the sucrose cake. However, the general appearance and texture were satisfactory.

The dextrose-containing cake that was processed in the microwave oven had a moisture content of 24 percent, excellent flavor, texture and general appearance and was even considerably lighter in color than the sucrose cake processed in the microwave oven.

Other cakes were prepared both in the conventional oven and microwave oven and contained different amounts of dextrose or invert sugar. In each case, the cakes cooked in the conventional oven were dark in color whereas those prepared in the microwave oven were acceptable or even light in color. Sugar blends were used as follows:

| Parts Sucrose | Parts Reducing Sugar |
|---|---|
| 90 | 10 dextrose |
| 80 | 20 dextrose |
| 50 | 50 dextrose |
| 30 | 70 dextrose |
| 0 | 100 dextrose |
| 90 | 10 invert |
| 40 | 60 invert |
| 30 | 70 dextrose 80%, levulose 20% |
| 60 | 40 dextrose 80%, levulose 20% |

Surprisingly, the cakes containing the highest quantity of dextrose were the lightest in color. In all cases, moisture content was sufficient to provide a desired texture and the flavor was acceptable in each instance.

Cakes cooked in a microwave oven having radiant lamps exhibit a light brown crust. A light brown crust is also obtained when the finished cake from the microwave oven is subsequently placed in a conventional oven at a high temperature of about 400°–500° F. for a few minutes.

While the invention has been described in connection with specific embodiments thereof, it will be understood that it is capable of further modifications and this application is intended to cover any variations, uses or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

I claim:

1. A process for making a pound cake type of product comprising:
   preparing a cake batter that contains a protein component and a sugar component, wherein from about 10 percent to about 90 percent of the sugar component is reducing sugar and the balance is sucrose;
   cooking the batter by radiant microwave energy at a frequency and for a period of time sufficient to produce a cooked cake whose interior is substantially free of color development, and
   applying a source of heat energy to the exterior at a temperature and for a period of time sufficient to develop a light brown crust.